United States Patent [19]
Ploeckl

[11] 3,890,034
[45] June 17, 1975

[54] OPTICAL SCANNER

[75] Inventor: Johann Ploeckl, Unterhaching, Germany

[73] Assignee: Zellweger AG, Uster, Switzerland

[22] Filed: July 20, 1973

[21] Appl. No.: 381,282

[30] Foreign Application Priority Data

Aug. 22, 1972 Switzerland ...................... 12446/72

[52] U.S. Cl. ...................... 350/7; 350/285; 178/7.6; 250/230

[51] Int. Cl. ............................................ G02b 17/00

[58] Field of Search ........... 350/6, 7, 285, 293, 294, 350/296; 178/7.6; 250/230, 560, 552, 564

[56] References Cited

UNITED STATES PATENTS

| | | | |
|---|---|---|---|
| 2,971,695 | 2/1961 | Sick | 250/230 |
| 3,019,292 | 1/1962 | John | 350/7 |
| 3,782,803 | 1/1974 | Buck | 350/7 |
| 3,813,140 | 5/1974 | Knockeart | 350/7 |

*Primary Examiner*—Alfred E. Smith
*Assistant Examiner*—Michael J. Tokar
*Attorney, Agent, or Firm*—Werner W. Kleeman

[57] ABSTRACT

An optical scanner wherein a bundle of scanning light rays and a bundle of received light rays are guided via at least one optical element commonly associated with both of the aforesaid bundles of light rays. The impact areas for both bundles of light rays at the optical element are spatially offset with respect to one another and are located at a common impact surface of the optical element.

4 Claims, 3 Drawing Figures

OPTICAL SCANNER

BACKGROUND OF THE INVENTION

The present invention relates to a new and improved construction of optical scanner, especially an optical scanner for optically discernible characters associated with articles, preferably applied to such articles. The term "article", whether used in the singular or plural, as employed herein is intended to be used in its broader sense to encompass different types of goods, wares, products or the like which can have information in the form of characters or the like applied directly or indirectly thereto.

These characters can constitute information associated with the relevant articles, such characters preferably appearing in coded form. For the purpose of reading-out each such character a scanning light beam or bundle of light rays is guided over the character and depending upon the reflection capability of the location of the character momentarily impinged by such scanning light beam, a part of the thus transmitted light beam is reflected. A received bundle of light formed from at least part of the reflected light is delivered to an electro-optical receiver which transforms the received light beam into an electrical signal. This electrical signal can be delivered in conventional manner to a suitable processing device, typically a computer and evaluated. The evaluation result can concern, for instance, the price of the article, the introduction of this article price into a calculating installation, the determination of the sale of different articles, the article numbers of which are coded in character form, and quite generally can serve for controlling the warehouse or storage supply, just to mention a few notable possibilities.

In prior art scanners the scanning light beam is generated with the aid of a beam deflection device which, for instance, contains as a movable reflecting surface a rotatable-oscillating component. Such rotatable component can be, for instance, a polygon mirror or reflector, while as the oscillating component of the reflector there can be employed a mirror galvanometer system. With such scanners there is oftentimes employed at least one optical element, for instance a movably arranged reflecting surface and/or a concave mirror or reflector, both for the bundle of scanning light rays and also for the bundle of receiving light rays.

Such dual utilization of an optical element constitutes an economical solution, but, on the other hand, is however associated with a major drawback in the known arrangements. Such resides in the fact that owing to optical imperfections a part of the usually more intensive scanning light beam is transferred in the form of stray light into the bundle of received light rays. Since the bundle of received light rays or received light beam which is present, because of the reflection at the scanned article or object, itself only possesses low intensity and the information contained therein and obtained due to the different reflection characteristics possesses only a small level or amplitude, it is possible that even a small amount of stray light transfer from the scanning light beam to the received light beam sensitively impairs the signal to noise ratio of the output signal of a photoelectric receiver impinged by the received bundle of light rays.

SUMMARY OF THE INVENTION

Hence, a primary object of the present invention is to provide an improved construction of scanner of the previously mentioned type which is not associated with the aforementioned drawbacks and limitations of the prior art constructions.

Another and more specific object of the present invention relates to an improved construction of optical scanner of the previously mentioned type by means of which it is possible to effectively overcome the aforementioned stray light transfer phenomenon.

Now in order to implement these and still further objects of the invention, which will become more readily apparent as the description proceeds, the inventive scanner is manifested by the features that a bundle of scanning light rays and a bundle of received light rays are guided via at least one optical element commonly associated with both of the aforementioned bundle of light rays, and the impact areas of both of the bundle of light rays at the optical element are spatially offset with regard to one and are located at a common impact or impingement surface of the optical element.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
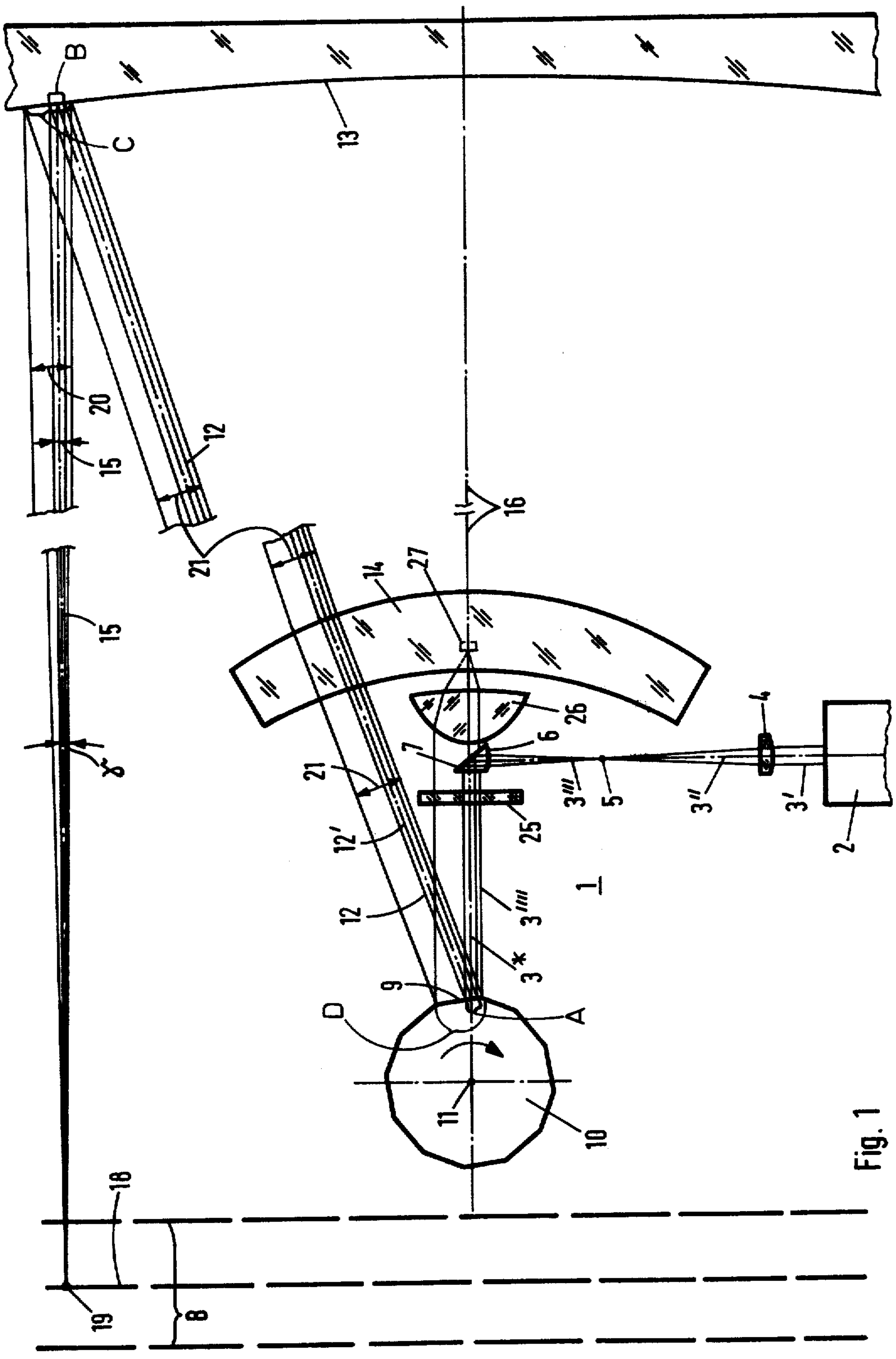
FIG. 1 is an exemplary embodiment in plan view of an optical system of a scanning mechanism or scanner, also schematically depicting the path of the light rays.

Reference will now be made to the accompanying drawings wherein it is to be appreciated that corresponding components have been designated throughout by the same reference characters, the drawings depicting details of the scanner designed according to the teachings of the present invention. As previously explained the scanner can be employed in reading apparatus for the reading of optically discernible characters, typically presented in coded form, and for instance of the type disclosed in the commonly assigned, United States Applications, Ser. No. 221,706, filed Jan. 28, 1972, and entitled "Reader Mechanism For Optically Discernible Characters" and Ser. No. 221,702, filed Jan. 28, 1972, and entitled "Reading Apparatus For Optically Discernible Characters" to which reference may be readily had and the description of which is incorporated herein by reference for general background information.

Considering now FIG. 1, depicting therein an exemplary embodient of optical system of scanner in plan view and with the path of the light rays being shown, although for the purpose of providing clarity in illustration individual ray paths or beams have been shown in broken lines, it will be seen that the scanner or scanner mechanism 1 comprises a light source 2, preferably a laser light source, the emerging light beam of which is directed in the form of an essentially parallel bundle of light rays 3' against a cylindrical lens member 4. The axis of the cylindrical lens member 4 is perpendicular to the plane of the drawing. A converging bundle of light rays or light beam 3'' emanating from the cylindrical lens member 4 and of essentially elongate rectangular cross-section is focused at location 5 into a thin line disposed perpendicular to the plane of the drawing and then is transmitted in the form of a diverging bundle of light rays 3''' against a spherical inlet surface 6 of a totally reflecting prism 7. This prism 7 deflects the incident bundle of light rays 3''' at right angles and transmits an approximately parallel bundle of light rays 3'''' against a reflecting or impact surface 9 of a polygonal reflector or mirror 10 which rotates about an axis 11. The spherical surface 6 is designed such that the diverging bundle of light rays 3''' again becomes approximately parallel in the plane of illustration of FIG. 1 but thicker than the bundle of light rays 3'.

Figure 1A:
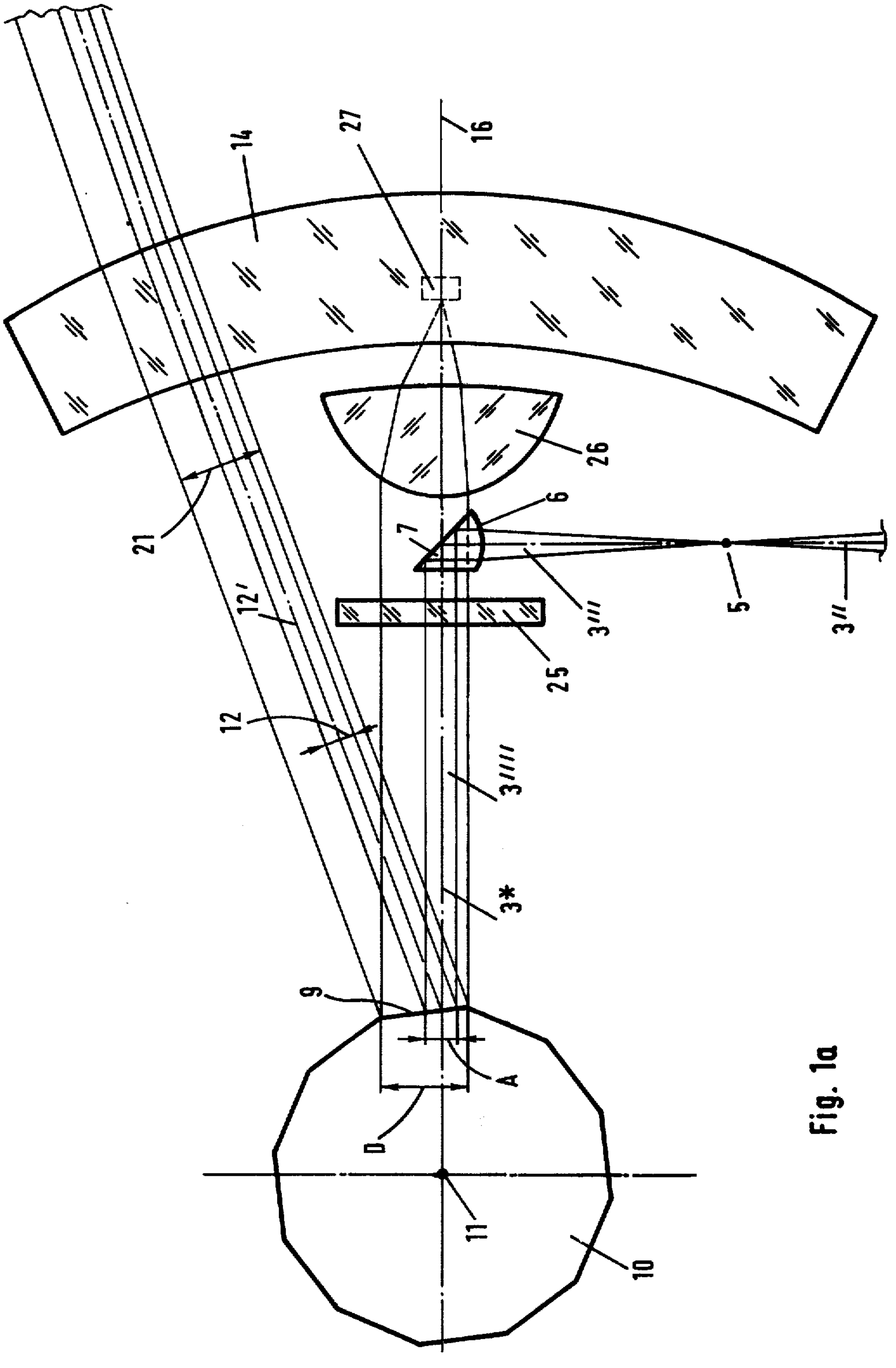
FIG. 1*a* is an enlarged detail view of the system of FIG. 1.
Figure 2:
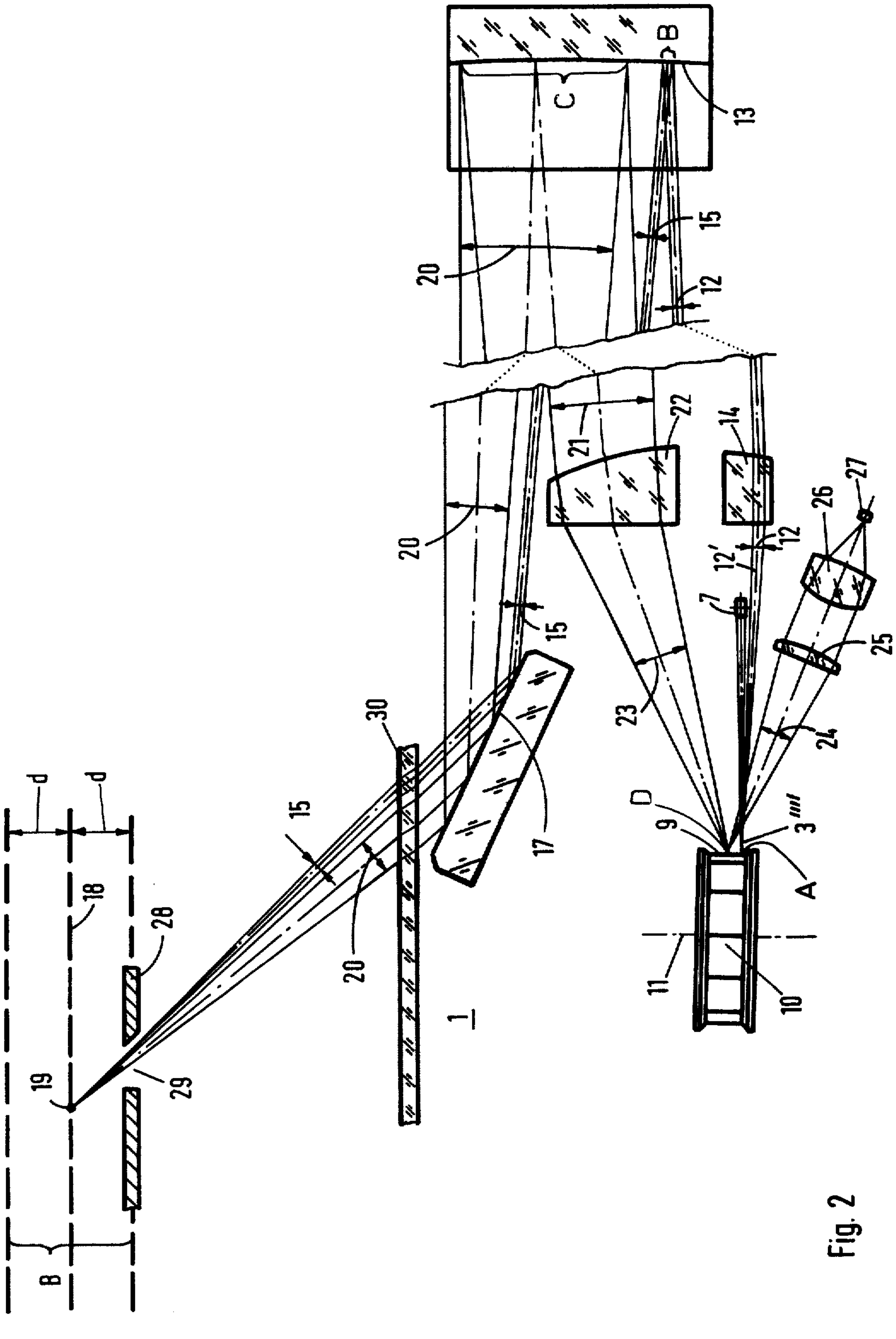
FIG. 2 is an elevational view of the optical system depicted in FIG. 1, with the light rays or beams being illustrated.

Furthermore, the spacing of the prism 7 from the polygon mirror or reflector 10 is chosen such that the light beam 3'''' emanating from the prism 7 is focused into a narrow line at the impact or impingement area A at the reflecting or mirror surface 9 of the polygon reflector 10, as best seen by referring to FIGS. 1*a* and 2.

The optical elements arranged between the light source 2 and the reflecting or impact surface 9 of the polygon mirror 10, namely the cylindrical lens 4 and the prism 7, are collectively referred to hereinafter as the "first optical means".

The polygonal mirror or reflector 10 rotates about its axis 11 which is perpendicular to the plane of the drawing of FIG. 1. In this manner the polygonal reflector 10 produces a bundle of scanning light rays or scanning light beam 12 which pivots with twice the angular velocity of the polygonal reflector 10. The pivoting or angularly shifting bundle of scanning light rays 12 now passes a first torus-shaped meniscus lens 14 arranged between the polygonal reflector 10 and a concave mirror or reflector 13, the meniscus lens 14 preferably being located closer to the polygonal reflector 10. In the context of this disclosure the term "torus-shaped" as used in conjunction with the meniscus lens or lenses and similarly the term "cylindrical-shaped" as used in conjunction with the cylindrical lens or lenses is intended to encompass sections of such geometric configurations. Now at an intersection plane which is perpendicular to the plane of the drawing of FIG. 1 and which extends through the main beam 12' of the bundle of light rays 12 the light ray beam 12 is approximately parallel. The bundle of light rays or light beam 12 arrives at the concave mirror 13 at the impingement or impact area or surface B (cf. also FIG. 2) and is focused thereby as a converging scanning light beam 15, if desired via a deflecting mirror or reflector 17 arranged perpendicular to the main symmetry plane 16 of the optical system 1, in a scanning plane 18 disposed perpendicular to the plane of the drawing of FIG. 1 into a sharp light spot 19. The optical elements arranged between the reflecting surface 9 of the polygonal mirror or reflector 10 acting as the beam deflection mechanism and the scanning plane 18, namely the first torus-shaped meniscus lens 14, the concave mirror and the possibly provided deflecting mirror 17, are collectively referred to hereinafter as the "second optical means".

The focal point of the concave mirror 13 is preferably located at least approximately at the axis 11 of the beam deflection mechanism i.e., the polygonal mirror 10. The optical arrangement which has been designed according to the previously discussed considerations for the formation of the scanning light beam 15 produces a very small converging angle $\gamma$ of such scanning light beam 15. In this way there is achieved the result that the cross-section of the bundle of scanning light rays 15, which produces the scanning spot 19 at a character to be read, is still sufficiently small in comparison to the structure of the character to be read-out within a predetermined sufficiently large region in front of and behind the scanning plane 18, and thus the character to be scanned need only lie within this region, also known as the depth of focus region, and need not lie exactly in the scanning plane 18.

A received bundle of light rays 20 emanating from the scanning light spot 19 at a scanned character or target is reflected back via the impingement or impact area or surface C (cf. also FIG. 2) of the concave mirror or reflector 13 in the form of an approximately parallel bundle of light rays 21 and via a second torus-shaped meniscus lens 22 (FIG. 2) arranged for instance above the first torus-shaped meniscus lens 14 to the mirror or reflecting surface 9 of the polygon mirror 10. The converging bundle of light rays or beam 23 directed by the second torus-shaped meniscus lens 22 against the reflecting surface 9 is focused by the second torus-shaped meniscus lens 22 at the impingement or impact area or surface D (see FIGS. 1*a* and 2) at the reflecting surface 9.

In this regard the arrangement of both torus-shaped meniscus lenses 14 and 22 is chosen such that the impingement or impact area A for the light beam 3'''', which produces the scanning light beam 15, and the impingement or impact area D for the converging light beam 23 (FIG. 2) emanating from the received bundle of light rays 20, are spatially offset with respect to one another at the reflecting surface 9. In this way there is avoided that, owing to optical imperfections or defects, such as scratches, dust and the like at the reflecting surface 9, stray light from the much more intensive light current of the light beam 3'''' will be transferred into the bundle of received light rays 23. Such stray light transfer would unfavorably influence the signal-noise ratio at the photoelectric receiver impinged by the received bundle of light rays, as previously discussed at the outset of this disclosure.

As also best seen by referring to FIGS. 1 and 2, in similar manner it is advantageous to also spatially offset with respect to one another the impingement areas B and C for the bundle of light rays 12 and 20 respectively, at the concave mirror or reflector 13.

The bundle of light rays 23 which impinges from above at an inclination at the reflecting surface 9 is reflected downwardly at an inclination, as shown in FIG. 2, in the form of a diverging bundle of light rays or beam 24. This bundle of light rays 24 is transmitted through a third optical means, such as for instance a cylindrical lens 25 and a lens 26, against the active surface of a photoelectric receiver 27, such as for instance a photodiode.

The scanning plane 18 is located for instance at a spacing *d* (FIG. 2) above a cover plate 28 serving as a guide means. Cover plate 28 possesses a slot 29 through which passes both the bundle of scanning light rays 15 as well as also the bundle of received light rays 20. The described arrangement produces a sufficiently small scanning spot 19 for the scanning operation at a region B i.e., depth of focus region, of the thickness 2*d* which is spatially located to both sides of the scanning plane 18.

The described optical scanner is manifested by the features that the bundle of scanning light rays 3' emanating from the light source 2 is directed by the first optical means 4 and 7 against a first impingement area A of the movable reflecting surface 9 and that the bundle of received light rays 20 is directed by other optical means, namely the components 13 and 22, against a second impingement area D of the aforementioned common reflecting surface 9, wherein the first and second reflecting area A and D are respectively spatially offset or positionally shifted with regard to one another.

Moreover in the exemplary embodiment under discussion the bundle of scanning light rays 12 which emanates from the movable reflecting surface 9 is directed against a first impingement or impact area or surface B at a concave mirror 13 and the bundle of received light rays 20 emanating from the scanning light spot 19 is directed against the second impingement or impact area or surface C at the concave mirror 13, wherein such first and second impingement areas B and C are also spatially offset or positionally shifted with respect to one another. The reflecting surface 9 and the concave mirror or reflector 13 constitute optical elements which in each instance have commonly associated therewith a bundle of scanning light rays and a bundle of received light rays.

While there is shown and described present preferred embodiments of the invention, it is to be distinctly understood that the invention is not limited thereto, but may be otherwise variously embodied and practiced within the scope of the following claims.

What is claimed is:

1. An optical scanner comprising means for generating a bundle of scanning light rays from which there is formed a bundle of received light rays, at least one optical element conjointly associated with both said bundle of light rays, said optical element having impingement areas for both bundle of light rays which are spatially offset with respect to one another, said impingement areas being located at a common impact surface of the optical element.

2. The optical scanner as defined in claim 1, wherein said means for producing the bundle of scanning light rays comprises a light source, a first optical means, said optical element incorporating a movable reflecting surface having a first impingement area defining one of said impingement areas, the bundle of scanning light rays being directed through said first optical means against said first impingement area of the movable reflecting surface, further optical means, a second impingement area defining another of said impingement areas provided for the reflecting surface, the bundle of received light rays being directed via said further optical means against said second impingement area of the reflecting surface, said first and second impingement areas being spatially offset with respect to one another.

3. The optical scanner as defined in claim 1, further including a concave mirror having first and second impingement areas, said optical element incorporating a movable reflecting surface, and wherein the bundle of scanning light rays emanating from said movable reflecting surface is directed towards said first impingement area at said concave mirror and the bundle of received light rays emanating from a scanning light spot is directed against said second impingement area at the concave mirror, said first and second impingement areas of said concave mirror being spatially offset with respect to one another.

4. In an optical scanner comprising means for generating a bundle of scanning light rays directed towards a target and from which there is formed a bundle of received light rays due to reflection of the scanning light rays at the target, at least one optical element conjointly associated with and arranged in respective paths of movement of the scanning bundle of light rays and the reflected bundle of received light rays, said optical element having respective impingement areas which are spatially offset with respect to one another for the scanning bundle of light rays and the reflected bundle of received light rays, said impingement areas being located at a common impact surface of the optical element.

* * * * *